Figure 1:
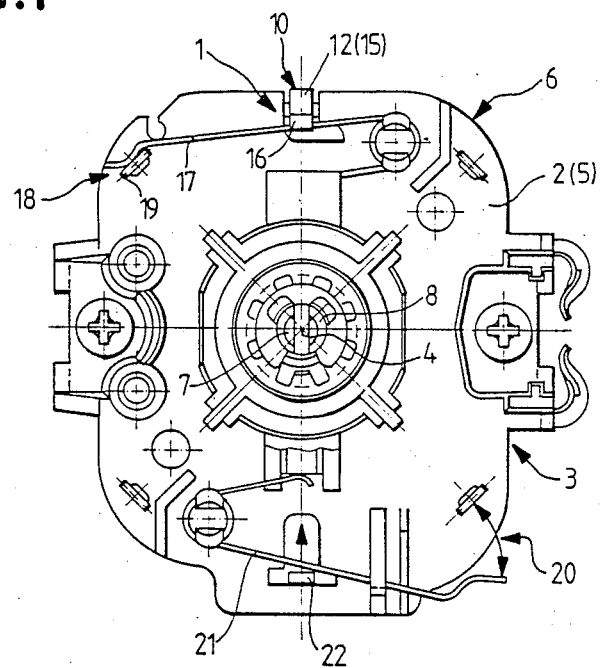

United States Patent [19]

Zimmermann

[11] Patent Number: 4,789,800

[45] Date of Patent: Dec. 6, 1988

[54] FUSE, IN PARTICULAR FOR ELECTRIC MOTORS

[75] Inventor: Walter Zimmermann, Barcelona, Spain

[73] Assignee: Braun Aktiengesellschaft, Kronberg, Fed. Rep. of Germany

[21] Appl. No.: 82,055

[22] Filed: Aug. 5, 1987

[30] Foreign Application Priority Data

Aug. 7, 1986 [DE] Fed. Rep. of Germany ....... 3626770

[51] Int. Cl.$^4$ .................... H02K 11/00; H01H 37/36
[52] U.S. Cl. ................................ 310/68 C; 337/402; 337/411
[58] Field of Search ............... 337/401, 402, 403, 404, 337/405, 411; 310/68 C

[56] References Cited

U.S. PATENT DOCUMENTS 3,723,932  3/1973  Miller .................... 337/405
4,360,725 11/1982  Eeckhout ............... 337/411

FOREIGN PATENT DOCUMENTS 1540984  1/1970  Fed. Rep. of Germany .
  97121 11/1960  Norway ................. 337/402
 476276 12/1937  United Kingdom .

Primary Examiner—H. Broome

[57] ABSTRACT

The invention is directed to a fuse (1), in particular for electric motors (3), which includes a sensor (13) taking support upon the stator winding (14) of the electric motor (3), the sensor being made of a fusible material the melting of which on undue heating of the stator winding (14) causes opening of a switching device (18) connected in the supply circuit of the motor.

7 Claims, 2 Drawing Sheets

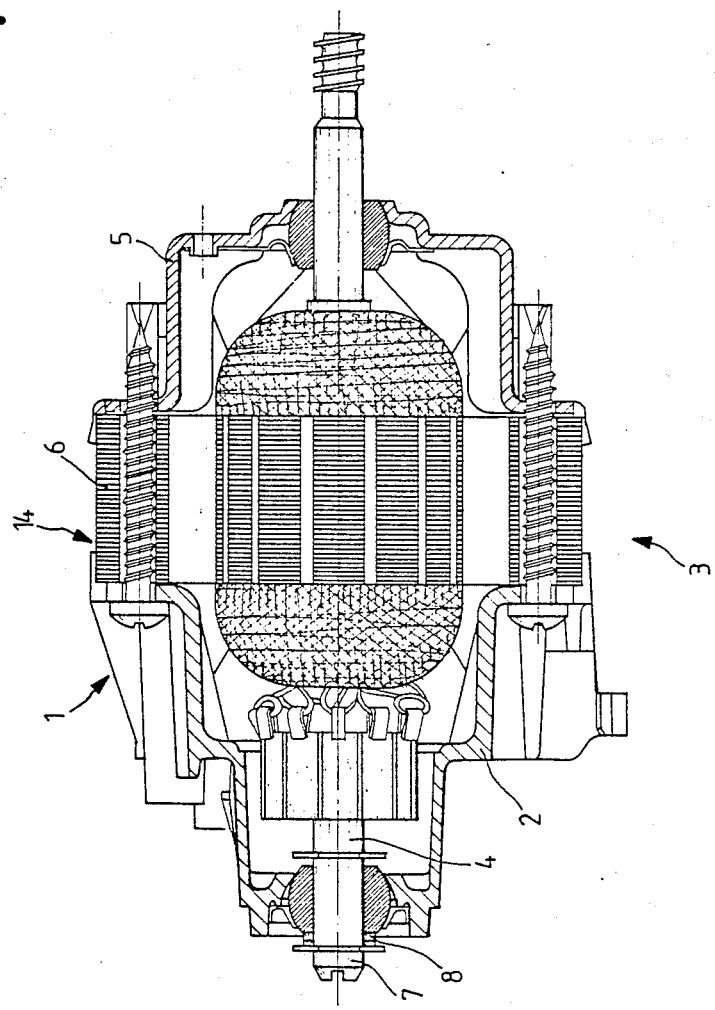

FUSE, IN PARTICULAR FOR ELECTRIC MOTORS

This invention relates to a fuse, in particular for electric motors.

Fuses connected into the supply circuit of different loads have been known for a long time. These fuses prevent further current supply to the individual load when its current carrying capacity is exceeded. Accordingly, fuses of this type operate in response to the amperage of the current passing through them.

It is, therefore, an object of the present invention to provide a simple fuse for electric motors which responds specifically to overheating of electric motors by breaking their load circuit.

This object is accomplished by the fuse constructed in accordance with the invention which is characterized by a sensor provided on the electric motor, the sensor being made of a fusible material the melting of which on undue heating of the electric motor causes opening of a switching device connected in the supply circuit of the motor. The fuse of the invention is largely adapted to fit the construction of the electric motor it controls and makes use of already existing contact elements of the motor to break its supply circuit when the machine is switched on and off and now also when an overload condition is present. The sensor which is made of a plastics material, for example, affords ease of replacement, assembly and high economy of manufacture.

A particularly quick response of the sensor is obtained by having it rest against the stator winding of the electric motor since this area heats the first when overheating occurs.

With regard to construction and operation of the fuse of the invention, a concept will be advantageous according to which the sensor is part of a transfer element associated with the stator, which element, as a result of the melting process of the sensor, moves from its initial position into a position causing opening of the switching device connected in the supply circuit of the electric motor.

This concept of the fuse of the invention is realized in a particularly simple and neat fashion with consequently low susceptibility to trouble if the transfer element receiving the sensor as the fusible component is a lever carried in the stator, the lever arm operatively associated with the driving end receiving the sensor which takes support upon the stator winding while the lever arm operatively associated with the driven end rests against a resilient control member associated with the switching device connected in the supply circuit of the motor, holding the control member in its closing position in which it engages the fixed mating contact of the switching device, whereas melting of the sensor results in a return movement of the lever, thereby causing disengagement from the fixed mating contact of the switching device connected in the supply circuit of the motor.

Figure 2:
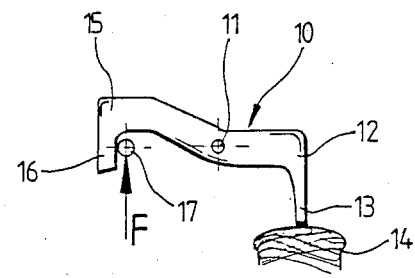

The subject-matter of the invention will be explained in more detail in the following with reference to the accompanying drawings illustrating one embodiment thereof. In the drawings, FIG. 1 is a view of the front end of the electric motor incorporating the fuse of the invention;

FIG. 2 is a schematic function drawing of the fuse of the invention, showing its construction and support on the stator of the electric motor; and FIG. 3 is a longitudinal sectional view of the electric motor of FIG. 1.

As becomes apparent from the Figures, the fuse 1 of the invention is operatively associated with the endwise (cap shaped) housing portion 2 of an electric motor 3. The stator 6 of the electric motor 3 is secured between the housing portion 2 and a second housing portion 5 arranged rearwards thereof in the direction of the motor axis 4 and therefore not visible in this Figure. A bearing 8 carrying the rotor shaft 7 is associated with both the housing portion 2 and the second housing portion 5.

The fuse 1 constructed in accordance with the invention comprises a two-armed lever 10 taking support on the stator 6 and adapted to pivot about a pivot axis 11 extending at right angles to the motor axis 4, that is, from the left to the right when viewing FIG. 1 of the drawing. The driving (first) lever arm 12 of the lever 10 serves as a holding means for a sensor 13 held in constant abutment with the stator winding 14 of the electric motor 3 by means of, for example, the stored force F of the resilient control member 17. In this embodiment, the sensor 13 is fabricated of a material that melts when the stator winding 14 develops undue heat, thus forming a releasing element of the fuse of the invention.

The (second) lever arm 15 of the lever 10 on the driven side has a hook-shaped end 16 against which the resilient control member 17 which, for example, is a spring wire bears with biasing force F. The spring arm 17 is part of a leg spring arranged in the supply circuit of the electric motor 3 and causing opening and closing of the switching device 18. In its initial position, the hook-shaped end 16 of the lever 10 holds the resilient control member 17 against the biasing force F in constant engagement with the mating contact 19 of the switching device 18, which contact is formed fast with the housing, thus holding the switching device in its closed position.

The controlling lever 10 fulfils the function of a transfer element transmitting the melting process of the sensor 13 to the switching device 18 by bringing it into the open position. If the sensor 13 melts as a result of undue heating of the stator winding 14 of the electric motor 3, the lever 10, on account of the diminishing strength of the sensor material, will pivot clockwise when viewing FIG. 2, so that the hook-shaped end 16 of the lever arm 15 will be moved upwards, when viewing FIGS. 1 and 2 of the drawing, by the resilient control member 17 which becomes disengaged from the fixed mating contact 19, as a result of which the switching device 18 connected in the supply circuit of the electric motor 3 will open and break the supply circuit of the electric motor 3. This turns the motor 3 off. In consequence, the fuse of the invention safely obviates the risk of burn-out of the stator winding of the motor 3.

Provided on the housing portion 2 is a further switching device 20 which corresponds to the switching device 18 yet has no fuse. The resilient control member 21 corresponds to the control member 17. To operate the switching device 20, an actuating rod 22 connected with a cover (not shown) which, for example, is part of a chopper or juice extractor, pushes the control member 21 upwards when viewing FIG. 1 of the drawing until contact with switching device 20 is established. It is thereby ensured that this food processor or some other electrical appliance can only be operated if the cover has securely closed the chopper which, for example, may be a cutting device, whereby the possibility of manual intervention in this danger area is reliably eliminated.

I claim:

1. In an electric motor having a housing, a stator in said housing, and a rotor mounted in said housing for rotation about a motor axis, thermal protection structure mounted in said housing comprising a switching device in a supply circuit of said motor, said switching device including a fixed terminal member and a resilient control member, lever structure pivotably mounted in said housing structure, said lever structure having a control portion at one end and a sensor portion at its opposite end, said sensor portion being made of fusible material and being seated against said stator, said control portion being in engagement with said resilient control member such that said control member is biased into engagement with said terminal member of said switching device to close said supply circuit of said motor, said sensor portion melting upon undue heating of said stator such that said lever structure moves and allows said resilient control member to move from a position in engagement with said switching device terminal member to open said supply circuit of said motor.

2. The motor of claim 1 wherein said stator has a winding portion and said sensor portion is seated against said winding portion of said stator.

3. The motor of claim 2 wherein said sensor portion is of plastics material.

4. The motor of claim 1 wherein said lever structure is pivotably mounted on said housing structure for rotation about a pivot axis perpendicular to said motor axis.

5. The motor of claim 1 wherein said control portion is of hook-shaped configuration, and said resilient control member is a spring wire against which said hook-shaped portion of said lever structure bears with biasing force.

6. The motor of claim 5 wherein said stator has a winding portion and said sensor portion is of plastics material and is seated against said winding portion of said stator.

7. The motor of claim 6 wherein said lever structure is pivotably mounted on said housing structure for rotation about a pivot axis perpendicular to said motor axis.

* * * * *